||

US010395829B2

(12) United States Patent
Ichikawa et al.

(10) Patent No.: US 10,395,829 B2
(45) Date of Patent: Aug. 27, 2019

(54) DIELECTRIC RESIN COMPOSITION FOR FILM CAPACITOR AND FILM CAPACITOR

(71) Applicant: MURATA MANUFACTURING CO., LTD., Nagaokakyo-shi, Kyoto-fu (JP)

(72) Inventors: Tomomichi Ichikawa, Nagaokakyo (JP); Norihiro Yoshikawa, Nagaokakyo (JP); Ichiro Nakamura, Nagaokakyo (JP); Shinichi Kobayashi, Nagaokakyo (JP); Ichiro Nakaso, Nagaokakyo (JP); Yasunori Hioki, Nagaokakyo (JP); Tomoki Inakura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1044 days.

(21) Appl. No.: 14/254,973

(22) Filed: Apr. 17, 2014

(65) Prior Publication Data

US 2014/0226256 A1 Aug. 14, 2014

Related U.S. Application Data

(63) Continuation of application No. PCT/JP2012/068031, filed on Jul. 16, 2012.

(30) Foreign Application Priority Data

Oct. 18, 2011 (JP) ................................. 2011-228424

(51) Int. Cl.
| | | |
|---|---|---|
| H01G 4/18 | (2006.01) | |
| C08L 71/12 | (2006.01) | |
| H01G 4/30 | (2006.01) | |
| H01G 4/32 | (2006.01) | |

(52) U.S. Cl.
CPC ................ *H01G 4/18* (2013.01); *C08L 71/12* (2013.01); *H01G 4/30* (2013.01); *H01G 4/32* (2013.01)

(58) Field of Classification Search
None
See application file for complete search history.

(56) References Cited

U.S. PATENT DOCUMENTS

| | | | |
|---|---|---|---|
| 2009/0312474 A1 | 12/2009 | Tan et al. | |
| 2010/0079926 A1 | 4/2010 | Tan et al. | |
| 2011/0110015 A1* | 5/2011 | Zhang | ............... H01G 4/20 361/311 |
| 2011/0310527 A1 | 12/2011 | Hioki et al. | |
| 2012/0008250 A1* | 1/2012 | Ichikawa | ............... C08J 5/18 361/303 |

FOREIGN PATENT DOCUMENTS

| | | | |
|---|---|---|---|
| JP | 10-119127 A | | 5/1998 |
| JP | 2010-087507 A | | 5/1998 |
| JP | 2003-160718 A | | 6/2003 |
| JP | 2008-229849 A | | 10/2008 |
| JP | 2010-192787 A | | 9/2010 |
| WO | WO 2010/114087 | * | 4/2010 |
| WO | WO-2010-101170 A1 | | 9/2010 |
| WO | WO-2010-114087 A1 | | 10/2010 |

OTHER PUBLICATIONS

List of miscible solvents, http://delloyd.50megs.com/moreinfo/immiscible.html, p. 1-2.*
PCT/JP2012/068031 Written Opinion dated Oct. 15, 2012.
PCT/JP2012/068031 ISR dated Oct. 15, 2012.

* cited by examiner

*Primary Examiner* — Robert T Butcher
(74) *Attorney, Agent, or Firm* — Arent Fox LLP

(57) ABSTRACT

A dielectric resin composition for a film capacitor is a mixture containing an organic material A and an organic material B. The organic material A includes at least two kinds of organic material components A1, A2, . . . having reactive groups (for example, OH, NCO) that cross-link each other. The organic material B does not have a reactive site capable of reacting with the organic material A and has a dielectric loss tan $\delta$ of 0.3% or less at a temperature of 125° C. The mixture has a glass transition temperature of 130° C. or higher and preferably 280° C. or lower.

19 Claims, 3 Drawing Sheets

DIELECTRIC RESIN COMPOSITION FOR FILM CAPACITOR AND FILM CAPACITOR

CROSS REFERENCE TO RELATED APPLICATIONS

The present application is a continuation of International application No. PCT/JP2012/068031, filed Jul. 16, 2012, which claims priority to Japanese Patent Application No. 2011-228424, filed Oct. 18, 2011, the entire contents of each of which are incorporated herein by reference.

FIELD OF THE INVENTION

The present invention relates to a dielectric resin composition for a film capacitor and a film capacitor including the dielectric resin composition for a film capacitor, and more particularly to an improvement for improving the voltage resistance and the heat resistance and reducing the dielectric loss of a dielectric resin film obtained from the above resin composition.

BACKGROUND OF THE INVENTION

As one kind of a capacitor, there is a film capacitor having a structure such that, while using a flexible resin film as a dielectric, first and second counter electrodes that oppose each other with the resin film interposed therebetween are disposed. A film capacitor typically has a form of an approximately cylindrical shape obtained by winding the above-described resin film serving as the dielectric. First and second external terminal electrodes are formed respectively on first and second end surfaces of the cylinder that oppose each other. The first counter electrode is electrically connected to the first external terminal electrode, and the second counter electrode is electrically connected to the second external terminal electrode.

As a dielectric resin film for the film capacitor, Japanese Patent Application Laid-open (JP-A) No. 10-119127 (Patent Document 1), for example, proposes a biaxially oriented polypropylene film and also proposes a film capacitor using this biaxially oriented polypropylene film as a dielectric resin film and being excellent in heat resistance and insulation breakdown characteristics. Polypropylene which is used as a material for a dielectric resin film of a film capacitor is a thermoplastic resin, and the upper limit of the temperature for the use thereof is typically 85° C.; however, in the polypropylene disclosed in Patent Document 1, the dielectric breakdown strength at 105° C. is improved to be 540 V/μm, thereby enabling use at a higher temperature.

However, as described above, in the dielectric resin film disclosed in Patent Document 1, the heat resistance is not yet satisfactory because the ensured temperature, though improved, is up to 105° C. For example, the dielectric breakdown strength at 125° C. is not disclosed in Patent Document 1. For this reason, it is not clear whether the dielectric resin film can be used for purposes that require high voltage resistance under a higher-temperature environment.

On the other hand, International Publication No. 2010/101170 Pamphlet (Patent Document 2) discloses the use of a dielectric resin film made of a thermosetting resin. A dielectric resin film made of a thermosetting resin has characteristic features such that the heat resistance is high; the dielectric breakdown strength of the resin is inherently high; and, in the case of a resin in which the glass transition temperature is above or equal to the ensured temperature of 125° C., the dielectric breakdown strength at a high temperature is high.

In particular, as a resin excellent in voltage resistance, a resin obtained by curing a mixture liquid of polyvinylacetoacetal (PVAA) and tolylenediisocyanate (TDI) disclosed in Patent Document 2 has an extremely high dielectric breakdown strength and can be used for purposes that require high voltage resistance.

On the other hand, in accordance with an increasing frequency of electronic apparatus in recent years, it is demanded that the characteristics of electronic components at a high frequency are good. A major problem in capacitors is the dielectric loss, that is, tan δ (dielectric tangent), at a high frequency. The dielectric loss tan δ is preferably as low as possible and is desirably zero. When this value is high, energy loss and heat generation accompanying this are generated, thereby inviting problems such as unstable operation and short lifetime of a high-frequency circuit. In the PVAA/TDI, the dielectric loss tan δ is as high as 0.75% at 25° C., 1 kHz, thereby raising a problem in that the use is difficult for purposes in which the heat generation is a problem.

As will be understood from the above description, a material having a high dielectric breakdown strength at a high temperature and having a tan δ of 0.5% or less has not been realized so far.

Next, Japanese Patent Application Laid-open (JP-A) No. 2010-87507 (Patent Document 3) proposes a film capacitor having two dielectric layers, wherein a first dielectric layer includes polyethylene terephthalate or polypropylene, and a coating layer made of a mixture of a thermoplastic resin and a thermosetting resin is disposed as a second dielectric layer immediately above the first dielectric layer.

However, according to the structure disclosed in Patent Document 3, the heat resistance and the electrical characteristics are dominated by the dielectric layer having the poorer performance of the two dielectric layers. Therefore, the technique disclosed in Patent Document 3 is not satisfactory for improving the heat resistance and the electrical characteristics.

Patent Document 1: Japanese Patent Application Laid-open (JP-A) No. 10-119127

Patent Document 2: International Publication No. 2010/101170 Pamphlet

Patent Document 3: Japanese Patent Application Laid-open (JP-A) No. 2010-87507

SUMMARY OF THE INVENTION

Therefore, an object of the present invention is to provide a dielectric resin composition for a film capacitor being capable of solving the problems as described above and having high voltage resistance, high heat resistance, and low dielectric loss.

Another object of the present invention is to provide a film capacitor including the dielectric resin composition for a film capacitor described above.

The present invention is first directed to a dielectric resin composition for a film capacitor. In order to solve the technical problems described above, the dielectric resin composition for a film capacitor has a structure described below.

That is, the dielectric resin composition for a film capacitor according to the present invention is a mixture containing a first organic material and a second organic material, wherein the first organic material includes at least two kinds of organic material components having reactive groups that cross-link each other; the second organic material does not have a reactive site capable of reacting with the first organic material and has a dielectric loss tan δ of 0.3% or less at a temperature of 125° C.; and the mixture has a glass transition temperature of 130° C. or higher. According to this dielectric resin composition, the heat resistance and the dielectric breakdown strength can be increased, and the dielectric loss can be reduced.

In the dielectric resin composition for a film capacitor according to the present invention, it is preferable that the first organic material and the second organic material both have an aromatic ring. This makes it possible to raise the glass transition temperature of the mixture, to further enhance the heat resistance, and to maintain the insulation breakdown voltage even at a high temperature.

It is preferable that the mixture has a glass transition temperature of 280° C. or lower. This makes it possible to allow the self-healing property of a wound-type film capacitor including the dielectric resin composition to function without a problem.

In the dielectric resin composition for a film capacitor according to the present invention, it is preferable that a blending ratio of the second organic material based on 100 parts by weight of a sum of the first and second organic materials is 20 parts by weight or more and 80 parts by weight or less. According to this preferable embodiment, the dielectric loss tan δ can be made to be as low as 0.5%, and the dielectric breakdown strength at 125° C. can be made to be as high as 250 V/μm or more.

It is preferable that the first organic material and the second organic material are soluble in a common organic solvent. This contributes to an improvement in the dielectric breakdown strength.

It is preferable that at least one kind among the at least two kinds of organic material components constituting the first organic material and the second organic material has a weight average molecular weight of 10,000 or more. This allows that when the dielectric resin composition is molded into a film, good flexibility is drawn out in the film, thereby improving the yield, processability, and handling property of the film.

In the preferable embodiment described above, it is preferable that the first organic material is polyacetal and polyisocyanate, and the second organic material is at least one kind selected from polycarbonate, polyphenylene ether, polysulfone, and polyarylate.

More preferably, the polyacetal is polyvinylacetoacetal, and the polyisocyanate is tolylenediisocyanate.

The present invention is also directed to a film capacitor including the dielectric resin composition for a film capacitor described above. The film capacitor according to the present invention includes a dielectric resin film obtained by curing the dielectric resin composition for a film capacitor described above and first and second counter electrodes that oppose each other with the dielectric resin film interposed therebetween.

According to the present invention, the dielectric loss tan δ of a cured mixture product of the first organic material and the second organic material can be suppressed by blending the second organic material as a thermoplastic resin having a low dielectric loss tan δ, and also the voltage resistance can be improved by increasing the cross-linking density using the first organic material as a thermosetting resin. That is, the second organic material as a thermoplastic resin having low voltage resistance and low heat resistance though having a low tan δ can be mixed with the first organic material as a thermosetting resin having a high dielectric loss tan δ though having high voltage resistance and high heat resistance, to thereby provide a dielectric resin composition for a film capacitor as a mixture that can compensate for the weaknesses of the two.

As described above, when a dielectric film having high voltage resistance can be realized, the thickness of the layer can be reduced, and a film capacitor having a high capacitance density can be obtained, resulting in a scale reduction of the film capacitor.

Also, when the dielectric loss tan δ can be suppressed, the use of the film capacitor at a high frequency is enabled.

DETAILED DESCRIPTION OF THE INVENTION

Figure 1:
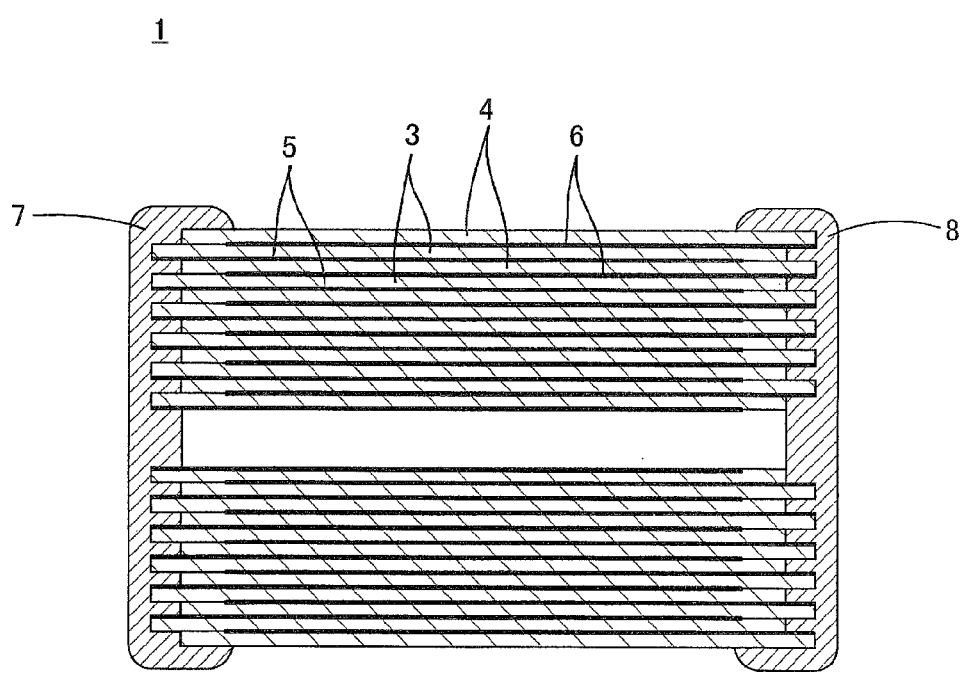
FIG. 1 is a longitudinal cross-sectional view illustrating a film capacitor 1 as one embodiment including a dielectric resin composition according to the present invention.

With reference to FIG. 1, a film capacitor including a dielectric resin composition according to the present invention will be described.

A film capacitor 1 shown in FIG. 1 is a wound-type capacitor. Briefly, the film capacitor 1 includes first and second dielectric resin films 3 and 4 in a wound state; first and second counter electrodes 5 and 6 that oppose each other with the first or second dielectric resin film 3 or 4 interposed therebetween; and first and second external terminal electrodes 7 and 8 that are electrically connected to the first and second counter electrodes 5 and 6, respectively.

More specifically, the first counter electrode 5 is formed on the first dielectric resin film 3, and the second counter electrode 6 is formed on the second dielectric resin film 4. At this time, the first counter electrode 5 is formed so as to reach one side end of the first dielectric resin film 3 but not to reach the other side end. On the other hand, the second counter electrode 6 is formed so as not to reach one side end of the second dielectric resin film 4 but to reach the other side end. The counter electrodes 5 and 6 include, for example, an aluminum film.

The first and second dielectric resin films 3 and 4 are wound so as to be stacked. At this time, as will be understood from FIG. 1, the first dielectric resin film 3 and the second dielectric resin film 4 are mutually displaced in the width direction so that an end part of the first counter electrode 5 that reaches the one side end of the first dielectric resin film 3 is exposed and an end part of the second counter electrode 6 that reaches the one side end of the second dielectric resin film 4 is exposed. Further, as described above, the first and second resin films 3 and 4 are wound, thereby providing a substantially cylindrical capacitor main body 9.

Here, in the film capacitor 1 shown in FIG. 1, the winding is performed such that the second dielectric resin film 4 is located outside of the first dielectric resin film 3, and the first and second counter electrodes 5 and 6 faces inside the first and second dielectric resin films 3 and 4, respectively.

The first and second external terminal electrodes 7 and 8 are formed, for example, by thermal spraying of zinc onto end surfaces of the substantially cylindrical capacitor main body 9 obtained as described above. The first external terminal electrode 7 is brought into contact with the exposed end part of the first counter electrode 5 to be electrically connected to the first counter electrode 5. On the other hand, the second external terminal electrode 8 is brought into contact with the exposed end part of the second counter electrode 6 to be electrically connected to the second counter electrode 6.

Although not illustrated in FIG. 1, the film capacitor may include a cylindrical winding shaft. That is, the winding shaft is disposed on the central axial line of the first and second dielectric resin films in a wound state and forms a winding axis in winding the first and second dielectric resin films. Here, when the film capacitor is not provided with a winding shaft as in the illustrated film capacitor 1, the wound body of the first and second dielectric resin films 3 and 4 may be pressed and crushed so as to have a cross-sectional shape such as an elliptic shape or an oblong circular shape, to thereby have a more compact shape.

The dielectric resin films 3 and 4 included in the film capacitor 1 are formed of a film obtained by curing the dielectric resin composition according to the present invention.

Figure 2:
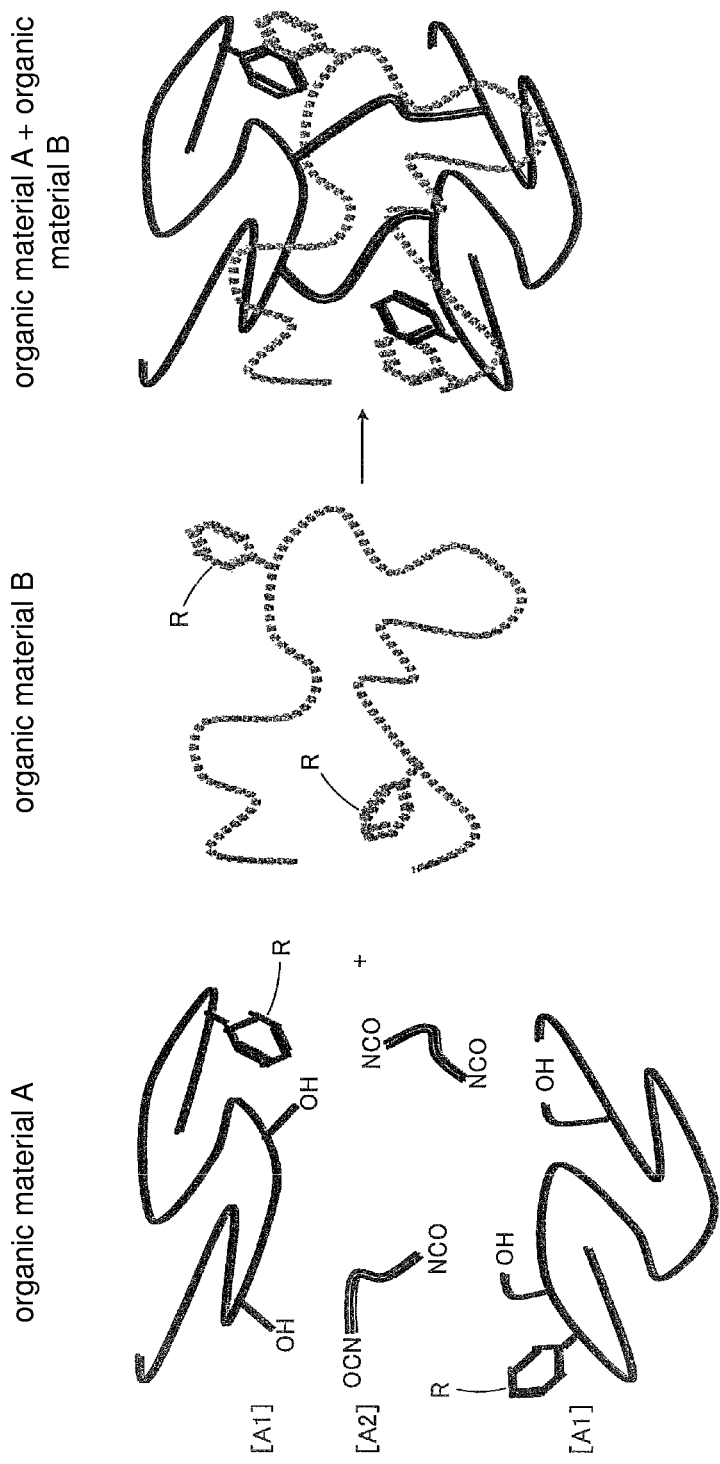
FIG. 2 is a view schematically illustrating a preferable embodiment of a mixture of a first organic material A and a second organic material B constituting the dielectric resin composition according to the present invention.

The dielectric resin composition for a film capacitor is a mixture containing a first organic material A and a second organic material B, as schematically shown in FIG. 2. The first organic material A includes at least two kinds of organic material components A1, A2, . . . having reactive groups (for example, OH, NCO) that cross-link each other. The second organic material B does not have a reactive site capable of reacting with the first organic material A and has a dielectric loss tan δ of 0.3% or less at a temperature of 125° C. Preferably, the first organic material A and the second organic material B both have an aromatic ring R. Further, the mixture has a glass transition temperature of 130° C. or higher and preferably 280° C. or lower.

According to the above dielectric resin composition, the dielectric loss tan δ of the mixed cured product of the first organic material A and the second organic material B can be suppressed by blending the second organic material B as a thermoplastic resin having a low dielectric loss tan δ, and the voltage resistance can be improved by enhancing the cross-linking density using the first organic material A as a thermosetting resin. That is, the second organic material B as a thermoplastic resin having low voltage resistance and low heat resistance though having a low dielectric loss tan δ can be mixed with the first organic material A as a thermosetting resin having a high dielectric loss tan δ though having high voltage resistance and high heat resistance, to thereby provide a dielectric resin composition as a mixture that can compensate for the weaknesses of the two.

More specifically, as will be understood from Experimental Examples described later, the condition with an dielectric breakdown strength at 125° C. of 225 V/μm or more and the condition with a dielectric loss tan δ at 125° C./1 kHz of 0.5% or less can be satisfied.

In this manner, when a high dielectric breakdown strength of 225 V/μm or more at 125° C. is realized in the dielectric resin films 3 and 4 included in the film capacitor 1 shown in FIG. 1, a reduction in thicknesses of the dielectric resin films 3 and 4 can be made, so that the capacitance density of the film capacitor 1 can be raised and, as a result, a scale reduction in the film capacitor 1 can be achieved.

As described above, when the dielectric loss tan δ at 125° C./1 kHz can be made to be 0.5% or less in the dielectric resin films 3 and 4, the film capacitor 1 can be used without a problem at a high frequency.

When the upper limit value of the glass transition temperature of the mixture of the first organic material A and the second organic material B is 280° C., the self-healing property can be allowed to function without a problem in the wound type film capacitor 1 as shown in FIG. 1.

Preferably, a blending ratio of the second organic material B based on 100 parts by weight of a sum of the first and second organic materials A and B is 20 parts by weight or more and 80 parts by weight or less. This allows that the dielectric loss tan δ can be made to be as low as 0.5%, and the dielectric breakdown strength at 125° C. can be made to be as high as 250 V/μm or more.

It is preferable that the first organic material A and the second organic material B described above are soluble in a common organic solvent. This contributes to an improvement in the dielectric breakdown strength.

It is preferable that at least one kind among the at least two kinds of organic material components A1, A2, . . . constituting the first organic material A and the second organic material B has a weight average molecular weight of 10,000 or more. This allows that when the dielectric resin composition is molded into a film, good flexibility is drawn out in the film, thereby improving the yield, processability, and handling property of the film.

In the above-described case, it is preferable that the first organic material is polyacetal and polyisocyanate, and the second organic material is at least one kind selected from polycarbonate, polyphenylene ether, polysulfone, and polyarylate.

More preferably, the polyacetal is polyvinylacetoacetal, and the polyisocyanate is tolylenediisocyanate.

These first organic material A and second organic material B exemplified above are soluble in a common organic solvent.

Next, Experimental Examples carried out in order to confirm the effect of the present invention and to determine the preferable scope of the present invention will be described.

EXPERIMENTAL EXAMPLE 1

In Experimental Example 1, a dielectric resin film was produced by using those listed in the "organic material A" and "organic material B" columns in Table 1 as the organic material A and the organic material B. In each of the "organic material A" and "organic material B" columns in Table 1, PVAA represents polyvinylacetoacetal; TDI represents tolylenediisocyanate; PC represents polycarbonate; and PP represents polypropylene.

Here, in Experimental Example 1,
polyvinylacetoacetal having a molecular weight of about 100,000,
tolylenediisocyanate having a molecular weight of about 1,000,
high molecular weight epoxy having a molecular weight of about 50,000,
polycarbonate having a molecular weight of about 40,000,
polypropylene having a molecular weight of about 100,000,
polyphenylene ether having a molecular weight of about 20,000,
polyarylate having a molecular weight of about 30,000,
polysulfone having a molecular weight of about 50,000, and
polystyrene having a molecular weight of about 50,000 were used, respectively.

The dielectric loss tan δ as determined under the conditions with a measurement frequency of 1 kHz, a measurement voltage of 1 V, and a measurement temperature of 125° C. with respect to the organic materials B used was:
- 0.15% in the case of polycarbonate,
- 0.01% in the case of polypropylene,
- 0.15% in the case of polyphenylene ether,
- 0.25% in the case of polyarylate,
- 0.30% in the case of polysulfone, and
- 0.20% in the case of polystyrene, and all of these satisfied the condition with a dielectric loss tan δ of 0.3% or less.

A detailed description of a method for producing a dielectric resin film with respect to samples 2 to 8 using "PVAA/TDI" as the organic material A and "PC" as the organic material B is as follows.

A resin solution in which a polyvinylacetoacetal powder was dissolved in a tetrahydrofuran solvent so as to attain a solid component concentration of 7 wt % and a resin solution in which a tolylenediisocyanate and polycarbonate powder was dissolved in a tetrahydrofuran solvent so as to attain a solid component concentration of 7 wt % were produced. While fixing the solid component concentration of PVAA/TDI to be 50/50 parts by weight as the organic material A, the organic material A and the organic material B were mixed so as to attain a blending ratio listed in the "blending ratio" column of Table 1, to thereby produce a mixture resin solution.

Next, on a polyethylene terephthalate substrate, the above mixture resin solution was formed into a film by using a coater, and the obtained film having a film form was thermally treated under the condition of 180° C. for one hour so as to obtain a dielectric resin film serving as a sample.

With respect to the samples other than samples 2 to 8, description will be given by comparing with the case of samples 2 to 8. In sample 1, while using PVAA/TDI which was the same organic material A as in the case of samples 2 to 8, a dielectric resin film was produced by using the organic material A alone.

In sample 9, while using PC which was the same organic material B as in the case of samples 2 to 8, a dielectric resin film was produced by using the organic material B alone.

In sample 10, while using PP in place of PC as the organic material B, a dielectric resin film was produced by using the organic material B alone.

In sample 11, while using PVAA/TDI as the organic material A, a dielectric resin film was produced by using the organic material A alone.

In samples 12 to 18, each dielectric resin film was produced by a method similar to that of the case of samples 2 to 8 except that a high molecular weight epoxy was used in place of PVAA in PVAA/TDI as the organic material A.

In sample 19, a dielectric resin film was produced by a method similar to that of the case of sample 4 except that polyphenylene ether was used in place of PC as the organic material B.

In sample 20, a dielectric resin film was produced by a method similar to that of the case of sample 4 except that polyarylate was used in place of PC as the organic material B.

In sample 21, a dielectric resin film was produced by a method similar to that of the case of sample 4 except that polysulfone was used in place of PC as the organic material B.

In sample 22, a dielectric resin film was produced by a method similar to that of the case of sample 4 except that polystyrene was used in place of PC as the organic material B.

Next, with respect to the dielectric resin film according to each of the samples obtained in the above-described manner, the dielectric constant, the dielectric loss, the glass transition temperature, and the dielectric breakdown strength were determined as shown in Table 1.

The dielectric constant and the dielectric loss (tan δ) were determined under the conditions with a measurement frequency of 1 kHz, a measurement voltage of 1 V, and a measurement temperature of 125° C. by forming an Al electrode on both surfaces of the dielectric resin film and using an LCR meter (4284A manufactured by Agilent Technologies, Inc.).

The glass transition temperature was measured by using a differential thermal analysis. For example, when the object was a mixture of the organic material A and the organic material B as in sample 2, the glass transition temperature of the mixture was determined. For example, when the object was the organic material A or the organic material B alone as in sample 9, the glass transition temperature of the single object was determined. Here, in the case of the mixture, the storage elastic modulus decays in two stages in relation to the glass transition temperature, so that a glass transition temperature Tg1 at the time of the first decay and a glass transition temperature Tg2 at the time of the second decay exist. In Table 1, the glass transition temperature Tg1 was listed.

With respect to the dielectric breakdown strength, a dielectric resin film piece having a size of 5 mm×20 mm and having an Al electrode formed on both surfaces thereof was used as a sample for evaluation. A voltage was applied between the electrodes on both surfaces of the sample for evaluation while raising the voltage step by step with an interval of 25 V/μm in the electric field intensity. The electric field application test of holding each electric field intensity for 10 minutes was carried out under 85° C. and under 125° C. The electrostatic capacitance after voltage application for attaining each electric field intensity was measured to confirm the presence or absence of breakage of the dielectric resin film. For each sample, a total of 20 pieces of the sample were used, and the number of samples in which the breakage was recognized was recorded together with the electric field intensity at which the breakage occurred. The value when the failure rate based on the Weibull distribution was 50% was used as a mean value of the dielectric breakdown strength

TABLE 1

| Sample No. | organic material A | organic material B | blending ratio (parts by weight) material A | blending ratio (parts by weight) material B | dielectric constant @125° C., 1 kHz | dielectric loss [%] @125° C., 1 kHz | glass transition temperature [° C.] | dielectric breakdown strength [V/μm] 80° C. | dielectric breakdown strength [V/μm] 125° C. | overall judgment |
|---|---|---|---|---|---|---|---|---|---|---|
| 1 | PVAA/TDI | — | 100 | 0 | 3.2 | 0.75 | 180 | 425 | 425 | X |
| 2 | PVAA/TDI | PC | 80 | 20 | 3.1 | 0.50 | 155 | 425 | 400 | ⊙ |
| 3 | | | 60 | 40 | 2.9 | 0.49 | 154 | 425 | 400 | ⊙ |
| 4 | | | 50 | 50 | 2.8 | 0.30 | 152 | 425 | 400 | ⊙ |
| 5 | | | 40 | 60 | 2.8 | 0.28 | 150 | 400 | 375 | ⊙ |
| 6 | | | 25 | 75 | 2.7 | 0.21 | 145 | 400 | 350 | ⊙ |

TABLE 1-continued

| Sample No. | organic material A | organic material B | blending ratio (parts by weight) material A | blending ratio (parts by weight) material B | dielectric constant @125° C., 1 kHz | dielectric loss [%] @125° C., 1 kHz | glass transition temperature [° C.] | dielectric breakdown strength [V/μm] 80° C. | dielectric breakdown strength [V/μm] 125° C. | overall judgment |
|---|---|---|---|---|---|---|---|---|---|---|
| 7 | | | 20 | 80 | 2.7 | 0.21 | 145 | 400 | 275 | ☉ |
| 8 | | | 10 | 90 | 2.7 | 0.18 | 130 | 375 | 225 | ○ |
| 9 | — | PC | 0 | 100 | 2.6 | 0.15 | 125 | 350 | 200 | X |
| 10 | — | PP | — | — | 2.2 | 0.01 | 102 | 450 | 225 | X |
| 11 | high molecular weight epoxy/TDI | — | 100 | 0 | 3.5 | 0.70 | 180 | 425 | 425 | X |
| 12 | high molecular weight epoxy/TDI | PC | 80 | 20 | 3.3 | 0.50 | 155 | 425 | 400 | ☉ |
| 13 | | | 60 | 40 | 3.1 | 0.45 | 154 | 425 | 400 | ☉ |
| 14 | | | 50 | 50 | 3.0 | 0.31 | 152 | 400 | 400 | ☉ |
| 15 | | | 40 | 60 | 2.8 | 0.28 | 150 | 375 | 375 | ☉ |
| 16 | | | 25 | 75 | 2.7 | 0.24 | 145 | 375 | 275 | ☉ |
| 17 | | | 20 | 80 | 2.7 | 0.22 | 145 | 375 | 275 | ☉ |
| 18 | | | 10 | 90 | 2.7 | 0.20 | 135 | 375 | 225 | ○ |
| 19 | PVAA/TDI | polyphenylene ether | 50 | 50 | 2.9 | 0.40 | 152 | 425 | 400 | ☉ |
| 20 | | polyarylate | 50 | 50 | 2.9 | 0.38 | 158 | 425 | 400 | ☉ |
| 21 | | polysulfone | 50 | 50 | 2.9 | 0.35 | 202 | 425 | 400 | ☉ |
| 22 | | polystyrene | 50 | 50 | 2.8 | 0.30 | 120 | 300 | 200 | X |

In the "overall evaluation" of Table 1, the samples being a mixture of the organic material A and the organic material B and satisfying the conditions with a glass transition temperature of the mixture of 130° C. or higher, a dielectric loss of 0.5% or less, and a dielectric breakdown strength of 250 V/μm or more at 125° C. were regarded as being good and denoted with "☉".

The samples being a mixture of the organic material A and the organic material B and satisfying the conditions with a glass transition temperature of the mixture of 130° C. or higher, a dielectric loss of 0.5% or less, but a dielectric breakdown strength of 225 V/μm or more and less than 250 V/μm at 125° C. were regarded as being fairly good and denoted with "○".

The samples not being a mixture of the organic material A and the organic material B and/or the samples not satisfying a condition with a glass transition temperature of the mixture of 130° C. or higher were regarded as being out of the scope of the present invention and denoted with "X".

Figure 3:
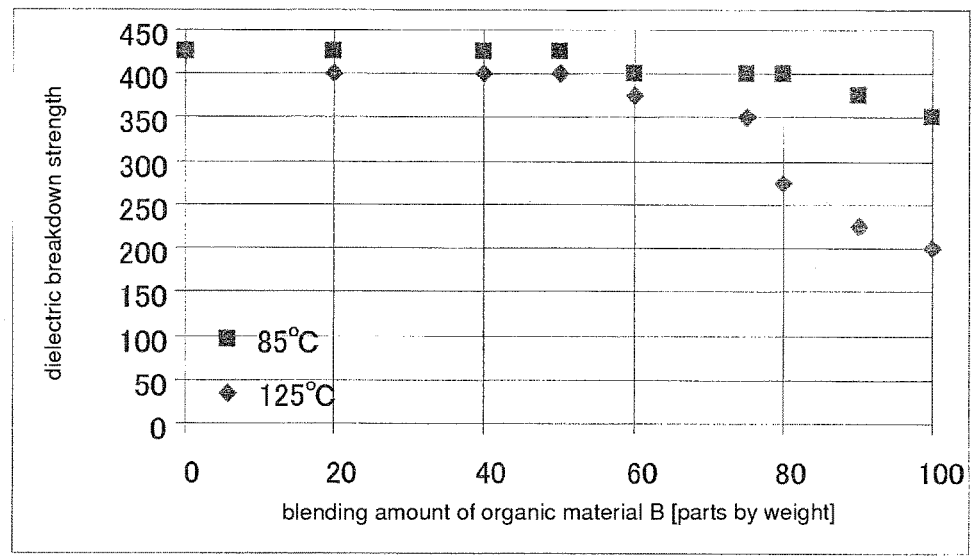
FIG. 3 is a view showing a relationship between an dielectric breakdown strength and a blending ratio of an organic material B based on a sum of organic materials A and B with respect to a dielectric resin film produced in Experimental Example 1.
Figure 4:
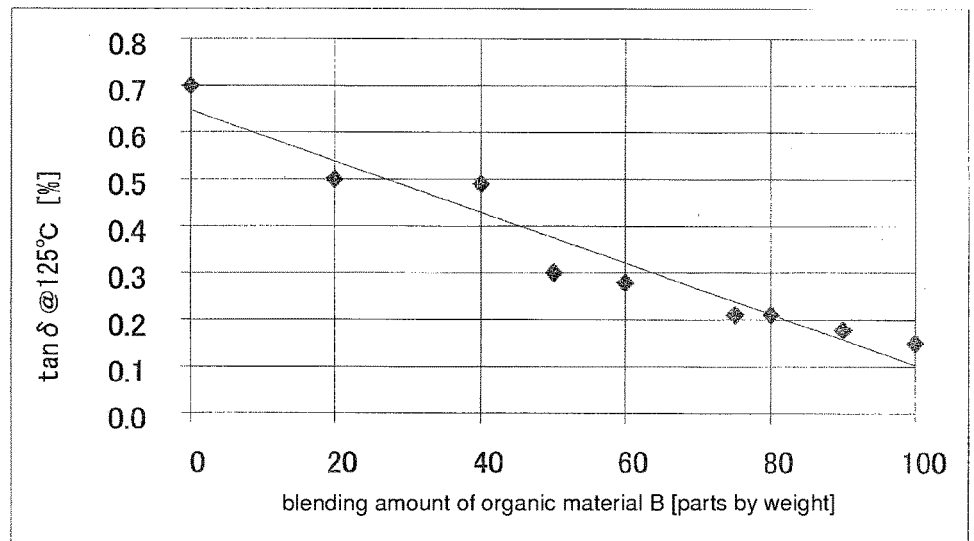
FIG. 4 is a view showing a relationship between tan δ and the blending ratio of the organic material B based on the sum of the organic materials A and B with respect to the dielectric resin film produced in Experimental Example 1.

In samples 1 to 9 shown in Table 1, while using the organic material A and the organic material B in common, the blending ratio of the organic material B is made to differ within a range of 0 to 100 parts by weight. The dielectric breakdown strength and the dielectric loss (tan δ) shown in Table 1 each can be confirmed also in FIG. 3 and in FIG. 4.

Samples 1, 9, 10, and 11 in which the "overall evaluation" is "X" are out of the scope of the present invention because the samples are not a mixture of the organic material A and the organic material B. In particular, in samples 1 and 11, the dielectric loss exceeded 0.5%.

Sample 22 in which the "overall evaluation" is "X" is out of the scope of the present invention because the sample does not satisfy the condition with a glass transition temperature of the mixture of 130° C. or higher. Also, the dielectric breakdown strength was less than 250 V/μm at 125° C.

In contrast, samples 2 to 8 and 12 to 21 in which the "overall evaluation" was "○" or "☉" satisfied the conditions with a dielectric loss of 0.5% or less, a glass transition temperature of the mixture of 130° C. or higher and a dielectric breakdown strength of 225 V/μm or more at 125° C.

In particular, in samples 2 to 7, 12 to 17, and 19 to 21 in which the "overall evaluation" was "☉", the blending ratio of the organic material B based on 100 parts by weight of the sum of the organic materials A and B was 20 parts by weight or more and 80 parts by weight or less, so that the glass transition temperature of the mixture was higher as compared with samples 8 and 18 that did not satisfy these conditions, and the dielectric breakdown strength showed a value of 250 V/μm or more, more specifically 275 V/mm or more, at 125° C.

EXPERIMENTAL EXAMPLE 2

In Experimental Example 2, the influence that the weight average molecular weight of the organic materials A and B exerted on the handling property of the dielectric resin film was evaluated by a bending test. That is, whether a fracture was generated or not when a dielectric resin film having a strip form and serving as a sample was folded and bent so as to make the two end surfaces thereof meet each other was evaluated.

In Experimental Example 2, PVAA (polyvinylacetoacetal) and TDI (tolylenediisocyanate) were used as the organic material A, and PC (polycarbonate) was used as the organic material B, as shown in Table 2. The weight average molecular weight of each of the prepared PVAA, TDI, and PC was as shown in Table 2. Further, a dielectric resin film serving as a sample was obtained by adopting a blending ratio similar to that of the case of sample 4 in Experimental Example 1 and undergoing similar operations. From this dielectric resin film, a strip-shaped film serving as a sample having a plane dimension of 50 mm×10 mm and a thickness dimension of 5 μm was obtained.

For each sample, the number of sample pieces was set to be 10, and the number of sample pieces in which a fracture occurred as a result of the bending test was counted. In the "bending test" column of Table 2, the case in which the number of fractured sample pieces was zero was denoted with "☉"; the case in which the number of fractured sample pieces was one or more and five or less was denoted with "○"; and the case in which the number of fractured sample pieces was more than five was denoted with "X". However, in the test of this time, none was denoted with "X".

TABLE 2

| Sample No. | organic material A | | organic material B Weight average molecular weight of PC | bending test |
|---|---|---|---|---|
| | Weight average molecular weight of PVAA | Weight average molecular weight of TDI | | |
| 31 | 10000 | 1000 | 10000 | ⊙ |
| 32 | 10000 | 1000 | 9000 | ⊙ |
| 33 | 9000 | 1000 | 10000 | ⊙ |
| 34 | 9000 | 1000 | 9000 | ○ |

As shown in Table 2, in sample 34 in which the weight average molecular weight of PVAA was 9,000 and the weight average molecular weight of TDI was 1,000 in the organic material A and the weight average molecular weight of PC serving as the organic material B was 9,000, a fracture occurred in two sample pieces, and the sample was evaluated as "○". However, in samples 31 to 33 in which the weight average molecular weight of at least one of the organic materials A and B, more specifically at least one of PVAA, TDI, and PC, was 10,000, no fracture occurred in any of the sample pieces, and these samples were evaluated as "⊙".

Accordingly, in terms of the handling property of the dielectric resin film, it is understood to be preferable that any one of the plural organic material components constituting the organic material A or the organic material B satisfies the condition that the weight average molecular weight is 10,000 or more.

Here, in Experimental Example 2 described above, the solid component concentration of PVAA/TDI serving as the organic material A was 50/50 parts by weight. However, it is understood to be preferable that 30 parts by weight or more of the organic material components having a weight average molecular weight of 10,000 or more is blended based on 100 parts by weight of the organic material A.

EXPERIMENTAL EXAMPLE 3

In the present invention, the upper limit value of the glass transition temperature of the mixture of the organic materials A and B was defined to be preferably 280° C. or higher. This is because, when the glass transition temperature is too high, there is a problem in that the self-healing property does not function when the dielectric resin film is applied to a wound-type film capacitor.

The self-healing (self recovery function) function is the function that an electrode metal flies away by the Joule heat generated at the film site where the dielectric breakdown has once occurred, and the broken part is turned into an open mode to restore the insulation. Generally, with respect to the self-healing property, it is said that self-healing hardly functions when the glass transition temperature and softening point of the organic material are too high.

Experimental Example 3 was carried out so as to confirm that it is proper to set a preferable upper limit value of the glass transition temperature to be 280° C. from the viewpoint of the self-healing property.

In Experimental Example 3, both of PVAA (polyvinylacetoacetal) and TDI (tolylenediisocyanate) or an epoxy resin was used as the organic material A, and any one of PC (polycarbonate), polysulfone, and polyimide was used as the organic material B, as shown in Table 3. Further, a dielectric resin film serving as a sample was obtained by adopting a blending ratio similar to that of the case of sample 4 in Experimental Example 1 and undergoing similar operations.

By a method similar to that of Experimental Example 1, the glass transition temperature of the mixture was determined, and the self-healing property was evaluated. The results thereof are shown in Table 3. In the "self-healing property" column of Table 3, "○" denotes that the self-healing property functioned, and "X" denotes that the self-healing property did not function.

TABLE 3

| Sample No. | organic material A | organic material B | glass transition temperature [° C.] | self-healing property |
|---|---|---|---|---|
| 41 | PVAA/TDI | PC | 152 | ○ |
| 42 | epoxy | polysulfone | 275 | ○ |
| 43 | PVAA/TDI | polyimide | 290 | X |

As shown in Table 3, in sample 41 in which the glass transition temperature of the mixture was 152° C. and in sample 42 in which the glass transition temperature of the mixture was 275° C., the self-healing property functioned. However, in sample 43 in which the glass transition temperature of the mixture was 290° C., the self-healing property did not function. Accordingly, it is understood that it is proper to set the upper limit value of the glass transition temperature to be preferably 280° C.

DESCRIPTION OF REFERENCE SYMBOLS 1 film capacitor
3, 4 dielectric resin film
5, 6 counter electrode
R aromatic ring

The invention claimed is:

1. A dielectric resin composition for a film capacitor, the dielectric resin composition comprising:
   a cured mixture containing a first organic material and a second organic material, wherein
   the first organic material includes at least two kinds of organic material components, each having reactive groups that cross-link with each other;
   the second organic material does not have a reactive site that reacts with the first organic material and has a dielectric loss tan δ of 0.3% or less at a temperature of 125° C.; and
   the mixture has a glass transition temperature of 130° C. or higher,
   the first organic material is a thermosetting resin,
   the second organic material is a thermoplastic resin, and
   the first organic material and the second organic material are soluble in a same organic solvent.

2. The dielectric resin composition for a film capacitor according to claim 1, wherein the first organic material and the second organic material both have an aromatic ring.

3. The dielectric resin composition for a film capacitor according to claim 1, wherein the glass transition temperature is 130° C. or higher and 280° C. or lower.

4. The dielectric resin composition for a film capacitor according to claim 1, wherein a blending ratio of the second organic material based on 100 parts by weight of a sum of the first and second organic materials is 20 parts by weight or more and 80 parts by weight or less.

5. The dielectric resin composition for a film capacitor according to claim 1, wherein at least one kind among the at least two kinds of organic material components constituting the first organic material and the second organic material has a weight average molecular weight of 10,000 or more.

6. The dielectric resin composition for a film capacitor according to claim 5, wherein the first organic material comprises polyacetal and polyisocyanate, and the second organic material is at least one of polycarbonate, polyphenylene ether, polysulfone, and polyarylate.

7. The dielectric resin composition for a film capacitor according to claim 6, wherein the polyacetal is polyvinyl acetoacetal.

8. The dielectric resin composition for a film capacitor according to claim 7, wherein the polyisocyanate is tolylene diisocyanate.

9. The dielectric resin composition for a film capacitor according to claim 6, wherein the polyisocyanate is tolylene diisocyanate.

10. The dielectric resin composition for a film capacitor according to claim 1, wherein the first organic material comprises polyacetal and polyisocyanate, and the second organic material is at least one of polycarbonate, polyphenylene ether, polysulfone, and poly aryl ate.

11. The dielectric resin composition for a film capacitor according to claim 10, wherein the polyacetal is polyvinyl acetoacetal.

12. The dielectric resin composition for a film capacitor according to claim 11, wherein the polyisocyanate is tolylene diisocyanate.

13. The dielectric resin composition for a film capacitor according to claim 10, wherein the polyisocyanate is tolylene diisocyanate.

14. A film capacitor comprising:
a dielectric resin film obtained by curing the dielectric resin composition for a film capacitor according to claim 1; and
first and second counter electrodes that oppose each other with the dielectric resin film interposed therebetween.

15. The film capacitor according to claim 14, wherein the first organic material and the second organic material both have an aromatic ring.

16. The film capacitor according to claim 14, wherein the glass transition temperature is 130° C. or higher and 280° C. or lower.

17. The film capacitor according to claim 14, wherein a blending ratio of the second organic material based on 100 parts by weight of a sum of the first and second organic materials is 20 parts by weight or more and 80 parts by weight or less.

18. The film capacitor according to claim 14, wherein at least one kind among the at least two kinds of organic material components constituting the first organic material and the second organic material has a weight average molecular weight of 10,000 or more.

19. The film capacitor according to claim 1, wherein the same organic solvent is a tetrahydrofuran solvent.

* * * * *